Feb. 26, 1924.
C. L. GINTY
1,485,222
SPRAYING APPARATUS
Filed Aug. 18, 1922   4 Sheets-Sheet 1
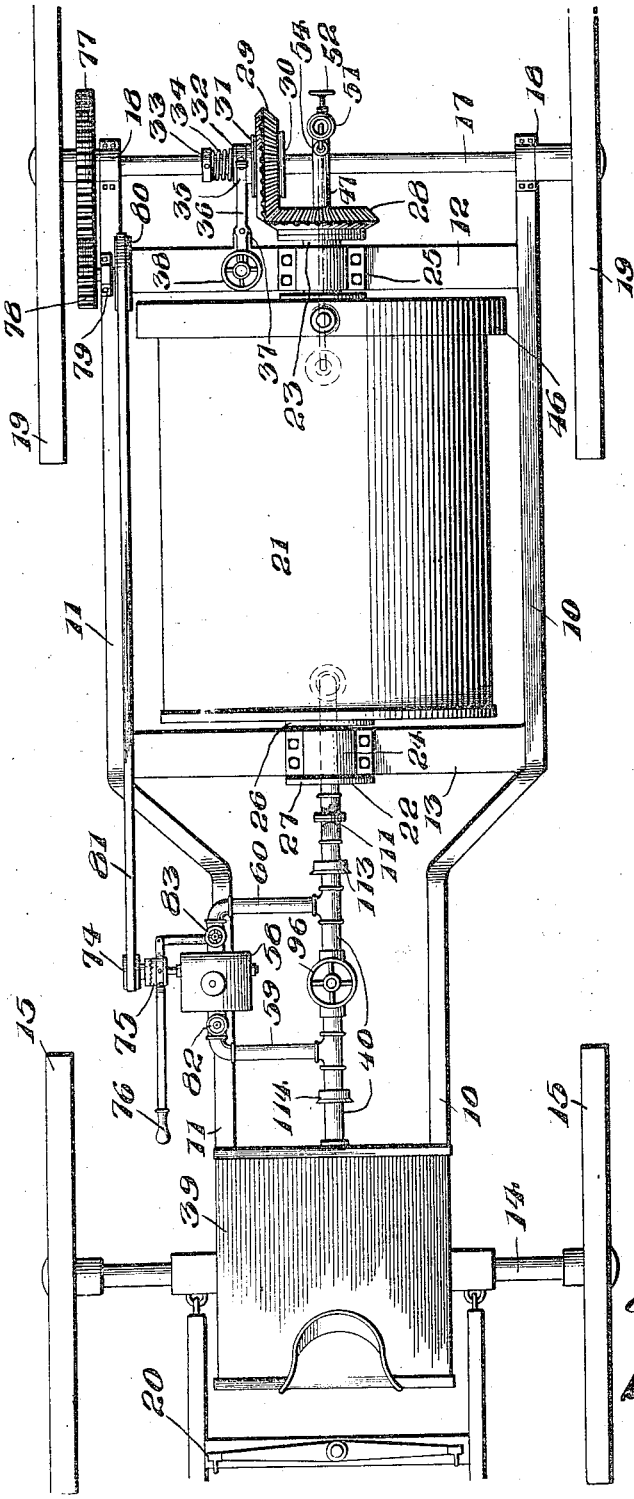
Inventor
Charles L. Ginty,
Attorney

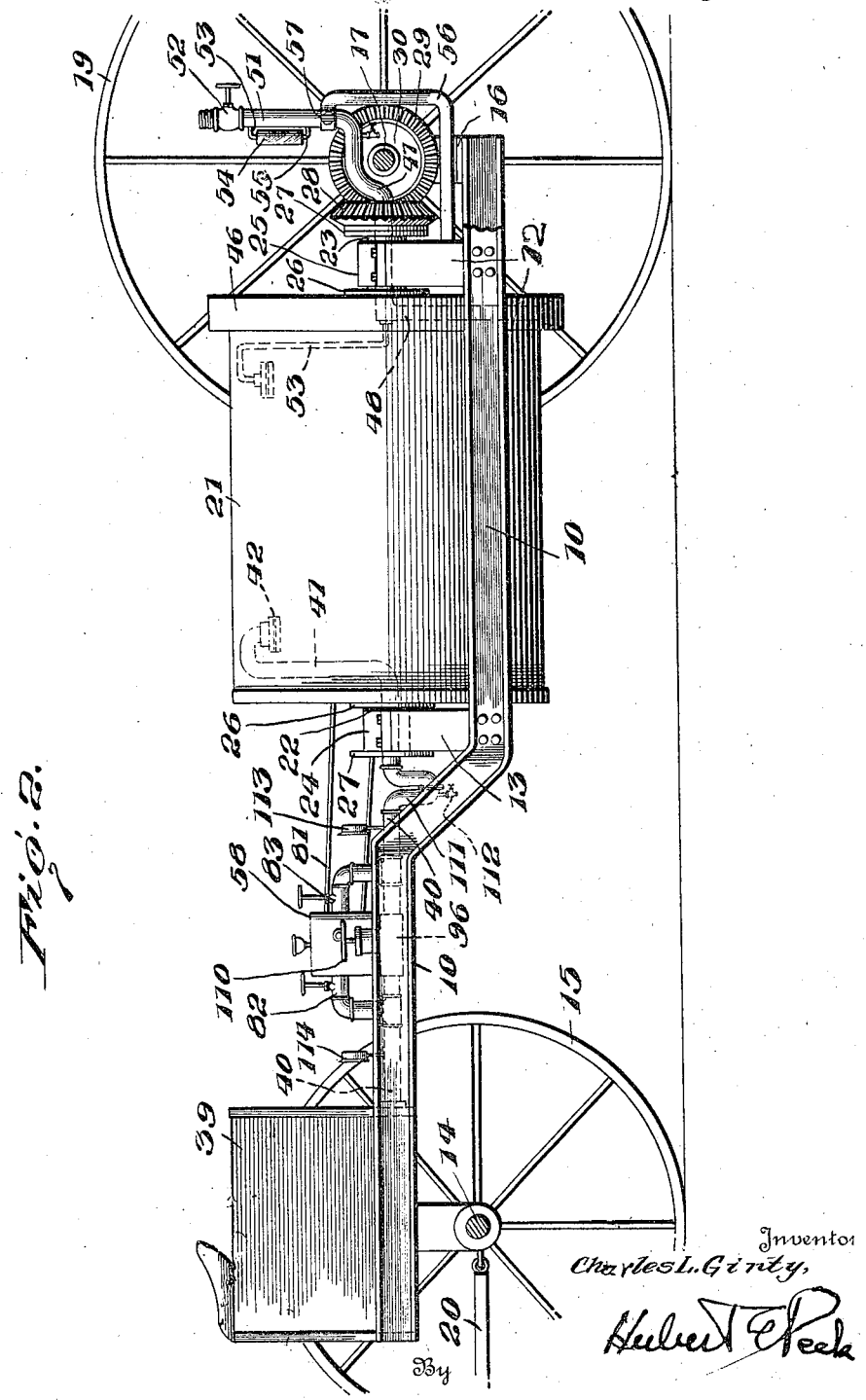

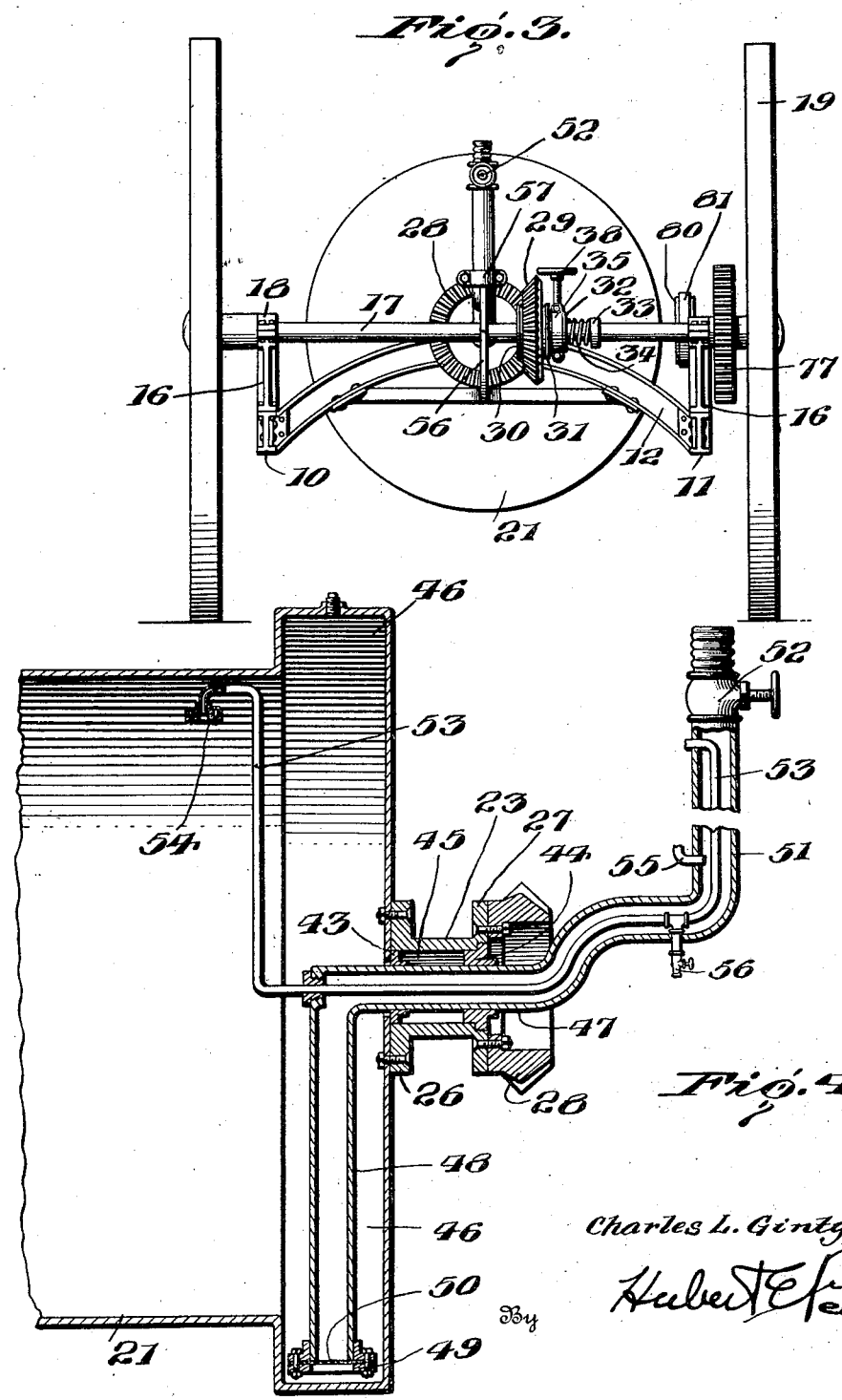

Feb. 26, 1924.

C. L. GINTY

SPRAYING APPARATUS

Filed Aug. 18, 1922

Inventor
Charles L. Ginty,
By
Hubert Cech
Attorney

Patented Feb. 26, 1924.

1,485,222

UNITED STATES PATENT OFFICE.

CHARLES L. GINTY, OF CAMBRIA, LOCKPORT, NEW YORK.

SPRAYING APPARATUS.

Application filed August 18, 1922. Serial No. 582,719.

*To all whom it may concern:*

Be it known that I, CHARLES L. GINTY, a citizen of the United States of America, and resident of Cambria, Lockport, county of Niagara, State of New York, have invented certain new and useful Improvements in and Relating to Spraying Apparatus, of which the following is a specification.

This invention relates to certain improvements in spraying apparatus; and the nature and objects of the invention will be readily recognized and understood by those skilled in the arts involved in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

The instant invention relates particularly to spraying apparatus of the portable or ambulant type adapted for spraying trees, crops and such like, as well as for general spraying operations, and one of the objects of the invention is to provide certain improvements in the construction, arrangement and operation of spraying apparatus of the foregoing general type, in order to increase the efficiency and utility of such apparatus.

A further object of the present invention is to provide spraying apparatus of the type having a spraying liquid supply tank, with means for either creating suction within the tank by partially exhausting the air therefrom so that liquid can be readily drawn into the tank to fill the same; or for creating pressure within the tank to force liquid therefrom in performing the spraying operations, and further to so arrange and mount such means that the same may be operated by the movement of the vehicle or the like upon which such spraying apparatus, when of the ambulant type, is transported.

A further object of the present invention is to provide spraying apparatus of the type having a spraying liquid tank from which the liquid is forced by pressure created within the tank, with an auxiliary compressed air tank for automatically supplying the spraying liquid tank with air under pressure, when the pressure within the tank drops or falls below a predetermined pressure; and to further provide such apparatus with means for building up pressure in the spraying liquid tank and in the auxiliary compressed air tank.

A further object of the invention is to provide spraying apparatus of the ambulant type with a rotatably mounted spraying liquid tank actuated by movement of the vehicle upon which the spraying apparatus is mounted, which tank is so constructed and arranged that spraying liquid can be forced therefrom by pressure created within the tank during rotation of the tank and without appreciable leakage of liquid therefrom or lowering of pressure therewithin.

A further object of the invention is to provide spraying apparatus having a spraying liquid tank which is filled with spraying liquid by suction created within the tank and from which spraying liquid is forced by pressure created within the tank, with a pump for creating the suction within the tank for drawing spraying liquid thereinto, and for building up pressure within the tank for forcing liquid therefrom, which pump is so constructed, mounted and connected with the tank that the spraying liquid drawn into the tank and forced therefrom does not come into contact with the pump, in order to overcome the corrosive and other detrimental and injurious effects of the spraying liquid on the operating parts of the pump.

A further object of the invention is to provide spraying apparatus having a spraying liquid tank and an auxiliary compressed air tank in communication therewith for supplying air under pressure thereto, with a pump mounted and arranged in communication with the spraying liquid tank and the auxiliary compressed air tank, in such a manner that air can be partially exhausted from the spraying liquid tank without effect upon the auxiliary compressed air tank, or pressure can be built up in the liquid tank and the auxiliary tank simultaneously by the pump.

A further object of the invention is the provision of spraying apparatus having a spraying liquid tank and an auxiliary compressed air tank in communication therewith for supplying air under pressure thereto, together with a pump for building up pressure in the liquid tank and the auxiliary tank and an automatically actuated valve controlling the supply of air under pressure from the auxiliary tank to the liquid tank, so that when the pressure in the liquid tank drops below a predetermined pressure, compressed air is discharged from the auxiliary tank to build up the pressure in the liquid tank to the required force.

A further object of the invention is to provide spraying apparatus of the ambulant type having a spraying liquid tank which is adapted to be filled with liquid by suction created by exhausting air therefrom and dscharged by pressure created therein, which apparatus is so constructed and arranged that after discharge of liquid from the tank air may be exhausted therefrom by and during the movement of the apparatus to a point of spraying liquid supply and pressure built up in the tank after filling thereof by the movement of the apparatus from the point of liquid supply to the point of spraying operations.

A further object of the invention is to provide certain improvements in the construction, arrangement and mounting of the various elements forming the spraying apparatus of the invention, whereby an efficient apparatus of positive operation and simple, durable construction results.

With the foregoing and various other objects in view, which other objects will be readily recognized and appreciated by those familiar with the art, the invention consists in certain novel features in construction and in combinations and arrangements of parts, as more fully and particularly set forth and specified hereinafter.

Referring to the accompanying drawings:

Fig. 1, is a top elevation of spraying apparatus of the ambulant type embodying the invention.

Fig. 2, is a side elevation of the apparatus shown in Fig. 1.

Fig. 3, is a rear end elevation.

Fig. 4, is a vertical, longitudinal section of the rear end of the spraying liquid tank of the invention, showing the liquid discharge line therefor in vertical section, and showing the rear end tank bearing and drive gear.

Figure 5:
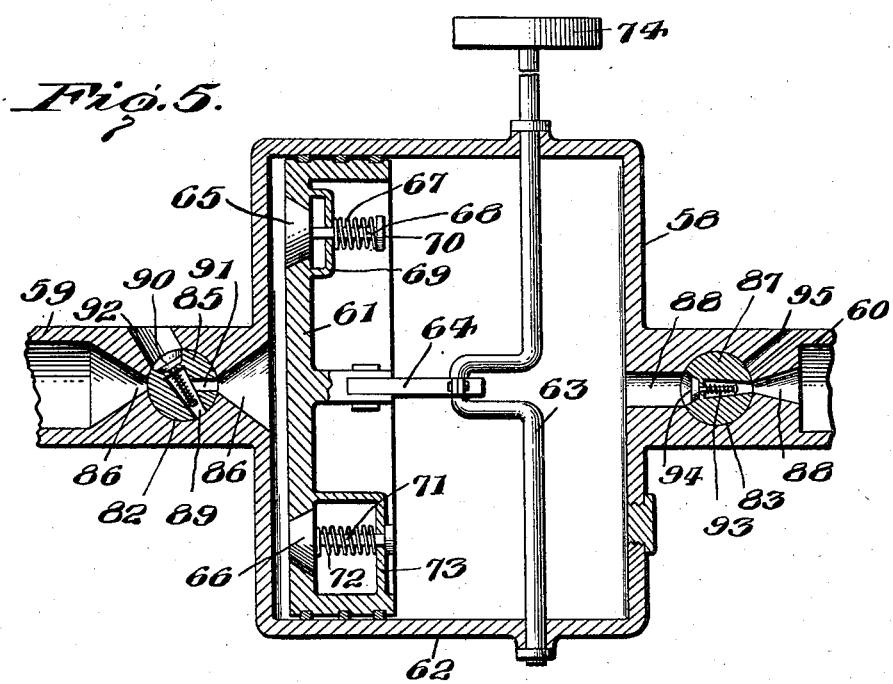
Fig. 5, is a longitudinal section through the pump and valves controlling the passage of air between the tanks of the invention.

One form of the invention is illustrated and described herewith purely by way of an example, in which the features of the invention are embodied in spraying apparatus of the ambulant wheeled type, although it is to be understood that various features of the invention are capable of adaptation to and embodiment in other general types of spraying apparatus, as will be readily apparent to those familiar with and skilled in this art. The invention is of particular utility and attains a high efficiency in the illustrated type of spraying apparatus and hence such type is disclosed in order to more clearly bring forth the various novel features and advantageous results of the invention.

In Figs. 1 to 3, of the accompanying drawings the invention is illustrated as including a wheeled supporting frame consisting of the spaced longitudinal side beams 10 and 11, which side beams are bent or formed to extend upwardly and inwardly a distance toward each other intermediate the ends of the frame, and extend forwardly a distance to form a front length of frame elevated above and of less width than the rear length of the frame. The rear, or lengths of the beams 10 and 11 at the greatest distance apart, are connected and braced by the upwardly arched cross member 12 adjacent the rear ends thereof, and the upwardly arched cross member 13 adjacent the upwardly and inwardly extending intermediate portions of the side beams 10 and 11. These arched cross members 12 and 13 are substantially parallel and extend upwardly and terminate a slight distance below the level of the elevated forward lengths of the frame side beams 10 and 11.

The forward end of the frame is provided with the axle 14 mounted in the usual or any other desired or suitable manner, and having the wheels 15 mounted thereon. The rear ends of the beams 10 and 11 are provided with the vertically disposed standards 16 across and on the upper ends of which the rear axle 17 is suitably mounted in bearings or journal boxes 18 of any desired or suitable type. The wheels 19 are mounted on and fixed to the axle 17 which is rotated thereby during movement of the wheeled supporting frame. Any usual or suitable draft means 20 may be provided at the forward end of the frame by means of which the same may be drawn.

A cylindrical spraying liquid tank 21 is rotatably mounted with its longitudinal axis horinzontally disposed, on and between the arched cross members 12 and 13, by means of stub shafts 22 and 23, fixed to and extending from the ends of the tank 21 along the longitudinal axis thereof, and journaled in suitable bearings or journal boxes 24 and 25, respectively, mounted on the arched cross members of the supporting frame. The stub shafts 22 and 23 on the forward and rear ends of the tank 21, are similar and each is provided with a flange 26 by means of which it is fixed to the tank end and a flange 27 at the outer end thereof which forms a guide to maintain the shafts against longitudinal movements in their respective bearings on the frame arched members. A part is provided through each end of the tank 21 in communication with the hollow stub shafts 22 and 23, as clearly illustrated in Fig. 4 of the accompanying drawings in which the mounting of the rear hollow shaft to the tank 21 is shown.

An annular bevel gear 28 is bolted, or otherwise fixed, to the flange 27 on the rear tank bearing shaft 23, and a bevel gear 29 is loosely mounted on the rear axle 17 in mesh with the tank gear 28. The loose gear 29 is mounted and confined in proper position on the axle 17 in mesh with the tank gear 28, by means of a clutch mechanism comprising a fixed clutch disc 30 shrunk, or otherwise suitably fixed, onto the axle 17, and a movable clutch disc 31 mounted on a key (not shown) fixed to the shaft, and slidable longitudinally of the axle to and from engagement with the loose gear 29. The slidable clutch disc 31 is provided with a collar 32 fixed thereto to rotate therewith and a collar 33 is spaced a distance along the axle 17 therefrom and mounted on and fixed to the axle. A coil spring 34 is interposed between the slidable clutch disc collar 32 and the fixed collar 33 on the axle 17. This coil spring 34 is so arranged that it normally maintains the slidable clutch disc 31 out of engagement with the loose gear 29 on the axle. Suitable clutch operating mechanism is provided for engaging the slidable clutch disc 31 with the gear 29 and to thereby cause rotation of the gear 29 with the clutch discs 30 and 31 between and by which it is engaged. It is to be understood that any desirable or suitable clutch disc operating mechanism may be provided, as well as any suitable clutch mechanism for causing rotation of the gear 29 by the axle 17. In the present instance and with the illustrated form of clutch, the operating mechanism comprises a band 35 around and loosely engaging a peripheral groove in the clutch disc collar 32, in such a manner the collar 32 is freely rotatable within the band 35. A lever 36 extends forwardly from the band 35 and is pivotally mounted on the arched cross member 12 of the frame at 37. A manual operating handle or hand-wheel 38 is mounted in operative relation with the pivoted lever in such manner that by actuation of the hand wheel 38 the lever 36 can be swung laterally in either direction on the pivot 37.

Thus from the foregoing it will be apparent that the gear wheel 29 is normally loosely mounted on the axle 17 in mesh with the tank gear 28, and that through the operation of the hand wheel 38, the rear or outer end of the lever 36 can be swung inwardly, and through the band 35 loosely confined on the clutch disc collar 32 will force the clutch disc 31 into engagement with the gear 29 and bind the latter between the disc 31 and the fixed clutch disc 30 on the opposite side of the gear 29. In this manner the gear 29 is caused to rotate with the axle 17 through the clutch discs 30 and 31, and rotates the tank gear 28 fixed on the tank shaft 23 to revolve the tank 21 on the shafts 22 and 23 in the journals or bearings 24 and 25, respectively, mounted on the arched cross frame members 13 and 12. By proper movement of the clutch operating hand wheel 38, the clutch discs 30 and 31 may be released from the gear 29 to permit rotation of the axle 17, independently of the gear 29, which latter remains idle and the rotation of the spraying liquid tank 21 is arrested.

An auxiliary compressed air tank 39 is suitably mounted on and fixed to the forward reduced width portion of side beams 10 and 11 of the wheeled supporting frame, preferably above the front axle 14. A main air supply pipe line or conduit 40 extends from the auxiliary tank 39 to and in communication with the revolving spray liquid tank 21, the pipe line 40 extending from and in communication with the auxiliary tank 39 at the lower portion thereof and approximately in line with the hollow bearing shaft 22 on the forward end of the spray liquid tank 21. The air pipe line or conduit 40 extends centrally and longitudinally through the hollow shaft 22 into the tank 21 and is formed with a vertically disposed length 41 terminating at the upper portion of the interior of the tank 21 in a depending spray or nozzle head 42. The head 42 is provided with a suitable line mesh screen (not shown) extending across the open or discharge end thereof to prevent entry of liquid or foreign matter into the pipe line 40, as will be readily understood by and familiar to those skilled in this art. Suitable packing is interposed in the hollow shaft and around the pipe line 40 extending therethrough to prevent leakage from the tank through the shaft around the pipe line 40. The arrangement of packing to form an air and liquid tight joint to permit rotation of the hollow shaft 22 around the fixed pipe line 40, is illustrated in Fig. 4, in which such a joint and packing is illustrated as applied to the rear hollow axle 23 of the tank 21, the arrangement of packing being simliar in both of the hollow bearing shafts 22 and 23 of the tank 21. A plate 43 (see Fig. 4) is secured in the hollow shaft, fixed to the end of the tank 21 and closing the port in the end of the tank which communicates with the hollow shaft, and this plate is formed with a central bore or aperture adapted to receive and form a running fit with a pipe line extending through the hollow shaft into the tank. The outer end of the hollow shaft is provided with a plate 44 fixed therein and closing the shaft, and this outer plate is likewise formed with a central bore or aperture alined with the bore in the inner plate 43 and adapted to receive and form a running fit with a pipe line extending through the hollow shaft. The inner and outer plates 43 and 44 form a chamber 45 within the hollow shafts of the tank and around a pipe line extending therethrough which chamber is adapted to be filled with any suitable or desired packing material. By the foregoing construction and mounting of the pipe line 40 in and extending through the hollow shaft 22, the shaft is revoluble around the fixed pipe line 40, without possibility of leakage from the tank through the hollow shaft, the tank being maintained substantially air and liquid tight by the arrangement of packing within the packing chamber 45 formed between the inner and outer plates 43 and 44 fixed in and rotatable with the shaft around the pipe line 40.

The rear end of the tank 21 is formed with a circumferential enlargement forming an annular chamber 46 therearound, and a spraying liquid discharge and intake pipe 47 extends through the hollow rear shaft 23 of the tank 21 and is formed with a depending vertically disposed length 48 extending and terminating in the lower portion of the tank within the annular chamber 46. The end of the depending length 48 of the pipe 47 is provided with a discharge and intake head 49 having a fine mesh screen 50 extending across the opening therein. (See Fig. 4.) The pipe 47 extends through the hollow shaft 23 and the closure plates 43 and 44 and packing chamber 45, in a manner similar to that hereinbefore described with respect to hollow shaft 22 and pipe line 40, to the rear of shaft 23 and gear 27 fixed thereon, and terminates in an upwardly extending vertically disposed stand pipe 51 having a shut-off valve 52 mounted therein for opening and closing the same.

An air pipe 53 extends through the discharge and intake pipe 47 into the upper portion of the tank 21 where it terminates in an intake head 54 provided with suitable guard screens to prevent entry of foreign matter thereinto. The air pipe 53 extends upwardly a distance through the standpipe 51 and passes outwardly through a side thereof where it is connected and placed in communication with the upper end of a suitable gauge or the like 54. The lower end of the gauge 54 is connected and placed in communication with the interior of the stand pipe 51 by a pipe 55. A suitable drain cock 56 is provided in the air pipe 53 and extends to and is operable from the exterior of the pipe 47. The stand pipe 51 and the pipe 47 are maintained in fixed position by means of a standard 56 secured to the arched cross member 12 of the frame and extending rearwardly and upwardly to the stand pipe 51, where it is provided with a collar 57 extending around and confining the pipe 51 in proper fixed, vertically disposed position.

A pump 58, in the present instance a reciprocatory force pump, is mounted on one side of the supporting frame intermediate the tank 21 and tank 39, in the example illustrated on the side beam 11. The air pipe line 40 is placed in communication with the pump 58 by the pipes 59 and 60, forming with the pump, in effect, a by pass line from the pipe line 40. In the illustrated example of the pump 58 and the mounting thereof, the pipe 59 is in communication with the forward end thereof, while the pipe 60 is in communication with the rear end thereof. The construction of the pump 58 is illustrated in Fig. 5 of the accompanying drawings. A piston 61 is slidably mounted in the pump cylinder 62 and is connected with a crank shaft 63, which is mounted extending transversely through and across the pump cylinder, by a connecting rod 64, so that rotation of the crank shaft causes reciprocation of the pump piston 61. The pump crank shaft extends outwardly from one side of the pump 58 and is provided with suitable operating connections hereinafter referred to and described. The pump piston 61 is provided with the valves 65 and 66 in and closing ports formed through the head of the piston. The valve 65 is mounted and arranged to seat in a conical port formed on the outer or forward side of the piston 61, and is adapted to be opened on the rearward stroke of the piston and closed by the forward stroke thereof. A spring 67 mounted on the valve stem 68 between the stem guiding and bearing bracket 69 and the valve stem head 70, maintains the valve 65 normally closed and seated. The valve 66 is mounted to seat in and close a port formed on the inner or rear side of the piston 61, and is adapted to be maintained normally closed during operation of the pump piston by means of a heavy spring 71 of greater tension than the normal force exerted on the valve 66 in operation, which spring is mounted on the valve stem 72 between the valve 66 and the bearing bracket 73 for the valve stem.

The driving mechanism for operating the pump piston 61 comprises a pulley 74 mounted on the outer end of the crank shaft 63, and suitable clutch mechanism 75 having an operating handle 76 (see Fig. 1 of the drawings) for engaging and disengaging the pulley 74 with the crank shaft 63. The rear axle 17 of the wheeled supporting frame of the apparatus is provided with a gear wheel 77 fixed thereon to rotate therewith. A gear wheel 78 is suitably mounted on the frame by means of a standard or bracket 79 (see Fig.

1) and in mesh with and driven by the gear 77 on the rear axle 17. The gear 78 drives a suitable pulley 80 which is fixed to and mounted on the shaft for the gear 78, and which pulley is operatively connected with and drives the pump crank shaft pulley 74 through the medium of a driving belt 81.

By the foregoing construction and arrangement, the pump pulley 74 is driven during movement of the wheeled supporting frame by the axle 17, gears 77 and 78 pulley 80, and the driving belt 81. The pump piston 61 is reciprocated by the pulley 74 when engaged with the crank shaft 63 by the clutch mechanism 75. The reciprocation of the pump piston causes the same to force or compress air on its forward stroke, as the valve 65 will be closed and the tension of the spring 71 on the valve 66 is sufficient to maintain valve 66 closed against normal air compressing force exerted thereon during the forward stroke of the piston. On the rear stroke of the pump piston 61, the valve 65 is opened, the spring 67 controlling the same being of relatively weak tension, and air passes through to the forward portion of the pump cylinder to be forced by the piston on its forward stroke, the foregoing operation being well understood by those skilled in this art. Manually operable valve mechanisms 82 and 83 are mounted in the pipes 59 and 60, respectively, adjacent the ends of the pump 58, for controlling the passage of air therethrough. These valve mechanisms are illustrated in detail in Fig. 5 of the accompanying drawings, the valve mechanism 82 comprising a plug valve 85 mounted transversely through the pipe 59 which latter is formed with a constricted portion providing a duct 86 therethrough controlled by the plug valve 85; and the valve mechanism 83 comprising a plug valve 87 mounted transversely through the pipe 60 which is formed with a constricted portion providing a duct 88 therethrough controlled by the plug valve 87. The plug valve 85 is formed with a conical bore 89 transversely therethrough adapted to be alined with the pipe duct 86, and having a spring controlled valve 90 mounted therein and normally maintained seated by the spring therefor to close the bore 89. A short bore 91 is formed through the plug valve 85 and extends through one side thereof at an angle to the bore 89 and terminates in communication with the bore 89. A bore 92 is provided through the pipe at an angle to the duct 86 therethrough and communicates with the atmosphere. The arrangement of the plug valve bores 89 and 91, is such that, in one position of the valve the bore 91 is alined with the duct 86 in the pipe 59, and in the other position thereof the short bore 91 is in communication with the inner or pump end of the duct 86, and the plug valve bore 89 is alined with the pipe bore 92 which opens to atmosphere. In this latter position of the plug valve the pump 58 is in communication with the atmosphere through duct 86, bore 91, bore 89 and the pipe bore 92. As hereinbefore pointed out the forward stroke of the pump piston 61 is the air compressing stroke, hence the spring controlled valve 90 mounted in the plug valve bore 89 is arranged to act as a check valve in the two positions of the plug valve, to wit, discharging into pipe 59, or discharging to atmosphere through bore 90.

The plug valve 87, of the valve mechanism 83 in the pipe 60, is provided with a conical bore 93 extending transversely therethrough and adapted in one position of the plug valve to be alined with the duct 88 in the restricted portion of the pipe 60. A spring controlled valve 94 is mounted in the conical bore 93 and normally seats in and closes the enlarged end of the bore 93, due to the action of the spring controlling the said valve 94. A bore 95 extends through the restricted portion of the pipe 60 at an angle to and terminates at its inner end in the plug valve bore 93, the outer end of the bore 95 communicating with the atmosphere. The plug valve 87 is mounted in the pipe 60 so that the enlarged end of the bore 93 is in communication with the pump end of the pipe duct 88, and the angle of the pipe bore 95, with respect to the width of the enlarged end of the conical bore 93, is such that when the plug valve is rotated to place the outer end of the bore 93 in communication with the pipe bore 95, the inner enlarged end of the bore 93 remains open to and in communication with the inner or pump end of the pipe duct 88. The foregoing construction and mounting of the valve mechanisms 82 and 83 will be readily understood by reference to Fig. 5 of the drawings.

Figure 6:
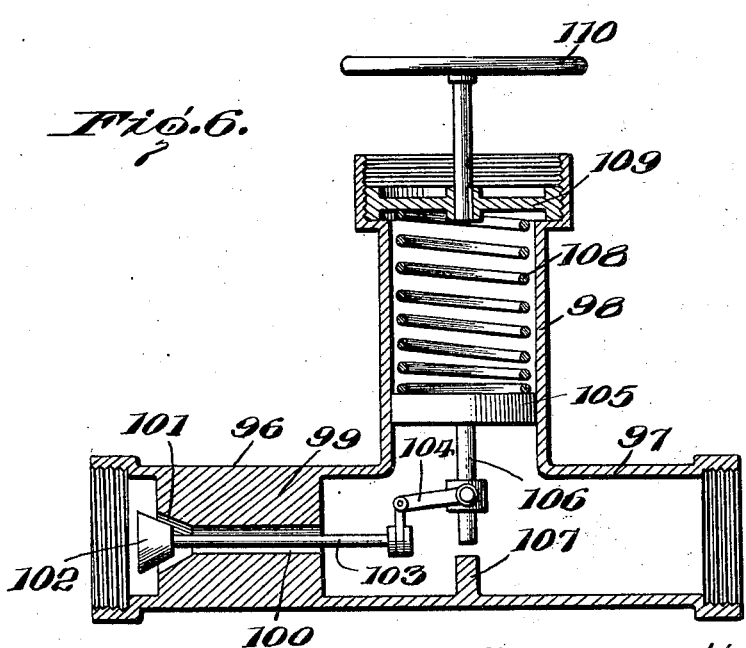
Fig. 6, is a vertical section through the automatic valve of the invention for controlling the discharge of air under pressure from the auxiliary tank to the spraying liquid tank.

An automatic controlling valve 96 is interposed in the main air pipe line between the points at which the pump pipes 59 and 60 are connected to and communicate with the main air line 40. This automatic controlling valve is illustrated in detail in Fig. 6 of the accompanying drawings, and comprises a pipe section 97 connected in the main air supply line and formed with a vertically disposed cylinder 98 intermediate the ends thereof and in open communication at its inner or lower end with the pipe section 97. A plug 99 having a central longitudinally disposed bore 100 is mounted in the section 97 between the cylinder 98 and the forward or compression tank 39 end of the section 97. The bore 100 terminates at its forward or outer end in a conical valve seat 101. A valve 102 is mounted at the forward end of the duct 100 for seating in the conical valve seat 101, to close the duct 100, on a valve stem 103 which extends through the duct 100 and is mounted at its inner end to a bell crank lever 104 pivotally mounted in the section 97 below the forward side of the cylinder 98. A piston 105 is mounted in the cylinder 98 for vertical reciprocation therein and is provided with a depending piston rod 106 pivotally connected with an arm of the bell crank lever 104. A stop 107 is mounted in the pipe section below and in line with the piston rod 106 to limit downward movement thereof. A coil spring 108 is interposed in the cylinder above the piston 105 and is confined therein by an adjustable cap 109 screw threaded into and closing the upper end of the cylinder 98. A hand wheel 110 is provided for raising and lowering the cap 109 to vary the tension of the spring 108 on the piston 105. The foregoing arrangement is such that, the spring 108 normally forces the piston 105 downwardly which rocks the bell crank lever 104 to force the valve stem 103 outwardly through the bore 100 and unseat the valve 102 from the conical valve seat 101, and thus open the bore 100 to passage of air therethrough. The functions and operation of this automatic controlling valve are explained in detail hereinafter.

The main air pipe line 40 is provided with a trap 111 adjacent the liquid tank discharge end thereof and this trap is provided with a series of fine mesh strainer screens (not shown) and with the usual drain cock 112. An air pressure gauge 113 is mounted in the air line 40 adjacent the tank 21 for determining the pressure within such tank, and an air pressure gauge 114 is mounted in the air line 40 adjacent the auxiliary tank 39 for determining the air pressure within said auxiliary tank.

The operation of the hereinfore described apparatus embodying the various features of the present invention will now be described. Assume that the tank 21 has been filled with the desired volume of spraying liquid and that the shut-off valve 52 in the intake and discharge pipe 51 is closed, and it is then necessary to build up pressure in the tank 21, through the action of which pressure the spraying liquid can be discharged from the tank as desired. The pressure is built up in the tank 21 by the pump 58 which is actuated as an air compressing force pump. To cause the pump 58 to build up the pressure in the tank 21, the plug valve 87 is rotated to a position with the bore 93 thereof in communication with the bore 95 in the pipe 60, and with the enlarged inner end of the bore 93 in communication with the pump cylinder through the duct 88. In this position of the plug valve 87 the pipe 60 is cut off from the pump and the latter is placed in communication with the atmosphere. The plug valve 85 is then rotated to position in the pipe 59 with the bore 89 therethrough in line and communicating with the duct 86, so that the pump is in communication with the pipe 59, and shut off from the pipe bore 92 which opens to atmosphere. With the valve mechanisms 82 and 83, in the positions above indicated, the clutch 75 is operated to engage the pulley 74 on the crank shaft 63, so that, as the wheeled supporting frame is drawn along, the crank shaft is rotated to reciprocate the pump piston 61, through the action of the gears 77, 78 driven by the rear axle 17, and the driving belt 81 connecting the pulley 80 with the crank shaft pulley 74. The reciprocation of the pump piston 61 causes the same to force and compress air on the forward strokes, due to the mounting of valve 65 and the tension of the spring 71 maintaining valve 66 normally seated. The air is forced on the forward strokes of the piston 61 through the duct 86 in the pipe 59 and the bore 89 in the plug valve 85 alined therewith, the spring controlled valve 90 in the bore 89 functioning as a check valve to permit passage of air into pipe 59 on the compression strokes of the pump piston 61 and to prevent back flow of air from the pipe to the pump on the non-compression (rear) strokes of the pump piston. The forward or compression strokes of the piston as well as forcing air into the pipe 59, at the same time suck or draw air into the pump cylinder from atmosphere through the bore 95, the spring controlled valve 94 in the bore 93 of the plug valve 87 acting as a check valve opening toward the pump cylinder on the forward stroke of the piston and closing to prevent escape of air drawn into the pump cylinder upon the rear or non-compression stroke of the cylinder. The air so drawn into and trapped in the pump cylinder on the compression strokes of the pump piston passes through the weak spring controlled valve 65 on the rear or non-compression strokes of the pump piston.

In this manner air is forced through the pipe 59 under pressure into the main air line 40 and passes therethrough forwardly into the auxiliary air tank 39, and rearwardly through the pipe line 40 into the liquid tank 21 through the vertically disposed pipe 41 and the bead 42 therewithin. The automatic valve 96, as set forth hereinbefore is normally maintained open by the spring 108 acting on the piston 105 thereof, so that the air forced from pipe 59 into pipe 40 has unobstructed passage under normal conditions into the liquid tank 21. The foregoing operations are continued to compress air and build up pressure in the spray liquid tank 21 and the auxiliary tank 39, until the pressure is built up in the tank 21 to a predetermined force. The predetermined pressure which may be built up in the tanks is determined by the tension at which the spring 108 acting on the piston 105 in the automatic valve 96, is set. When the pressure in tank 21 reaches a force sufficient to overcome the tension of the spring 108 in valve 96, the piston 105 is forced upwardly thereby which closes the valve 102, through the pivoted bell crank lever 104 connecting the piston rod 106 with the valve stem 103, and closes the tank 21 from the pump 58 and further supply of air under pressure. The pressure which may be built up in the auxiliary tank 39 is determined by the tension of the spring 71 which maintains the valve 66 normally closed in the pump piston 61. When the pressure is built up in the auxiliary tank 39 sufficiently to overcome the tension of the valve spring 71, the valve 66 is forced open and air escapes through the piston to atmosphere, thus preventing the creation of too great a pressure in the auxiliary tank. In effect, the valve 66 in the pump piston acts as a safety valve for the auxiliary tank 39, and for the spray liquid tank 21 as well, in the event of failure of the automatic valve 96 in the main air line 40.

The foregoing air compressing operations for building up pressure in the tanks 21 and 39 are continued until the desired degree of pressure is obtained, or until the pressure in tank 21 closes automatic valve 96 and the pressure in auxiliary tank 39 attains the limit of the valve 66. These pressures can be determined for tank 21 by the pressure gauge 113 in the pipe line 40, and for the auxiliary tank 39 by the pressure gauge 114 in the air line 40. After the desired pressures are obtained by the compressed air stored in the tanks 21 and 39, the clutch lever 76 is actuated to throw out the clutch 75 and disengage the pump 58 from its driving connections with the rear axle 17. The apparatus is then prepared for the spraying operations. Any suitable or desired spray heads or flexible hose connections are coupled to the end of the stand pipe 51 of the discharge pipe 47 and the shut-off valve 52 is opened to the required degree, upon opening of valve 52 the pressure in the tank 21 forces the spray liquid therefrom through the pipe length 48 in the tank, discharge pipes 47 and 51 through the spraying connections (not shown) connected with the said stand pipe 51. When the pressure is reduced in the tank 21, from continued spraying operations to a degree less than the tension of automatic valve spring 108, said spring forces piston 105 inwardly and opens valve 102 to permit discharge of compressed air from the auxiliary tank 39 through air line 40 into tank 21 to increase the pressure therein to the required degree to discharge spray liquid therefrom with the desired force. If the pressure is raised by this means above tension of automatic valve spring 108, the valve 102 is closed until pressure in tank 21 again drops.

Preferably during spraying operations the liquid tank 21 is revolved through the operation of gears 28 and 29 and the clutch discs 30 and 31 being engaged with the gear 29 on the rear axle 17, in a manner hereinbefore described in detail. The revolution of the tank will thoroughly mix the spraying liquid, as well as breaking up and pulverizing solid portions of the ingredients forming the mixture, which through any cause have gained entry into the tank 21. The construction of the tank 21 with the enlarged annular chamber 46 thereabove and the section 48 of the liquid discharge pipe extending and terminating therewithin, permits of the discharge of the entire liquid contents of the tank, as when the liquid is practically discharged and the level is low in the tank, the movements of the tank will cause the liquid to drain into the chamber 46 from which it is readily forced through the section 48 of the discharge pipe. The mounting and location of the air pipe 41 in the tank 21 is such that the liquid in the tank cannot be readily thrown thereinto or otherwise gain entry into the pipe 41 or the main air line 40.

After the supply of spraying liquid has been forced from the tank 21, the tank can be filled by suction in the following manner. The shut-off valve 52 in the stand pipe 51 is closed. The plug valve 87 is rotated to the position shown in Fig. 5 with the pipe bore 95 to atmosphere closed thereby and the valve bore 93 in communication with the duct 88 of the pipe 60. The plug valve 85 is rotated to the position indicated in Fig. 4 with the bore 91 thereof in communication with the inner or pump end of duct 86 in pipe 59 and with the enlarged end of bore 89 in communication with the pipe bore 92 opening to atmosphere, while the pipe 59 is cut off from communication with the pump by the body of the plug valve 85. The clutch 75 is thrown to engage pulley 74 and cause operation of the pump piston 61, which then acts as an air exhausting pump drawing air from tank 21 and discharging the same to atmosphere through bore 92, the spring controlled valves 90 and 94 in the respective plug valves performing the function of check valves during the air exhausting operation. Inasmuch as in the instant arrangement of the automatic valve 96, this valve is normally open the operation of the pump to an exhaust air from tank 21, also results in the exhaustion of air from the auxiliary tank 39, thus increasing the suction force of the apparatus in filling tank 21. The degree of minus or sub-atmospheric pressure which may be created in the tanks is determined by the tension of spring 71 of valve 66, as when the minus pressure in the tanks is sufficient to draw valve 66 open, air under atmospheric pressure is admitted to the tanks.

When the desired degree of minus pressure is established in the tanks a connection is made from the stand pipe 51 of the discharge pipe 47 to a suitable source of liquid supply and the shut-off valve 52 in pipe 51 is opened. Upon opening of valve 52 a suction is created by the minus pressure in the tanks and liquid is drawn into tank 21 through stand pipes 47 and 48. Liquid is drawn into the tank 21 until the volume therein overcomes the suction effect of the minus pressure at which point substantial equalization is reached and the valve 52 closed. From this point on the creation of positive pressure and the spraying operations have been fully described hereinbefore. Generaly in the use of spraying apparatus of the portable or ambulant type the source of liquid supply is distant from the field of spraying operations and the apparatus of the present invention is of extreme utility under such conditions, as after filling the liquid tank the spraying pressure can be built up therein by the movement of the apparatus from the point of liquid supply to the field of spraying operations, and after the liquid has been consumed in spraying the minus pressure in the tanks for filling the same can be created by the movement of the apparatus to the point of liquid supply.

Any suitable or desired spray devices (not shown) may be attached to and connected with the spraying liquid discharge pipe from the tank 21, which spray devices may be either of the flexible and portable type, such as flexible hose and spray nozzles, or of the type having a series of spray nozzles and mounted on and suspended from the rear end of the wheeled supporting frame. It is not deemed necessary herein to disclose such devices as it will be clear and understood by those familiar with this art, the manner in which such devices are operated.

The various features of the invention can be readily adapted to and embodied in various forms in other than spraying apparatus of the portable or ambulant type. It is also evident that various changes, modifications, variations and substitutions might be resorted to without departing from the spirit and scope of my invention, and hence I do not wish to limit the invention to the exact disclosures hereof.

Desiring to protect my invention in the broadest manner legally possible, what I claim is:

1. In spraying apparatus, a liquid tank, an auxiliary air tank, an air line from said auxiliary tank to and communicating with said liquid tank, an automatic valve mounted in said air line and controlling passage therethrough, a by pass line from said air line around said automatic valve mounted therein, and a pump mounted in said by pass line for forcing air therethrough and into said tanks for building up pressure therewithin, the said automatic valve adapted to be closed when the pressure in said liquid tank reaches a predetermined pressure.

2. In spraying apparatus, a liquid tank, an auxiliary air tank, an air line from said auxiliary tank to and communicating with said liquid tank, an automatic valve in said air line controlling passage of air therethrough, a by-pass line from said air line around said automatic valve, a pump mounted in said by-pass line and valves mounted in said by-pass line for actuation to cause said pump to force air into said tanks to build up pressure therein, or to exhaust air from said tanks to create minus pressure therein, the said automatic valve in said air line normally open and adapted to be closed by the pressure in said liquid tank exceeding a predetermined pressure.

3. In spraying apparatus, a spray liquid tank, an auxiliary tank, an air line from said auxiliary air tank to and communicating with said liquid tank, a by-pass line from the liquid tank end of said air line to the auxiliary tank end thereof, a pump mounted in said by-pass line, and valve mechanisms for closing the liquid tank side of said by-pass line and placing the same in communication with atmosphere to cause the pump to force air through the auxiliary tank side of said by-pass line and into said tanks to build up pressure therein, or to open the liquid tank side of said by-pass line and close the auxiliary tank side and place the same in communication with atmosphere to cause the pump to draw air from said tanks through the said air line and the liquid tank side of said by-pass line and discharge the air to atmosphere to create minus pressure in the said tanks.

4. In spraying apparatus, a spray liquid tank provided with opposite end hollow axles extending from the tank along the longitudinal axis thereof, the said tank mounted for rotation on said hollow axles, a fixed liquid discharge pipe extending through one of said hollow axles to the interior of said tank and depending into the lower portion thereof, a fixed air pipe extending through the other of said hollow axles to the interior of said tank and terminating and discharging into the upper portion of said tank, means for rotating said tank, and means for discharging air under pressure into said tank through said air pipe, or for exhausting air from said tank through said air pipe to create minus pressure within the tank.

5. In ambulant spraying apparatus, a wheeled supporting frame, a spray liquid tank rotatably mounted on said frame, driving connections between said wheeled frame and said tank for rotating the latter, a clutch mechanism for engaging and disengaging said tank rotating connections, a fixed liquid discharge pipe extending and depending into the lower portion of said tank, a controlling valve in said liquid discharge pipe, a fixed air pipe extending into said tank and discharging in the upper portion thereof, and means actuated by said wheeled frame for forcing air under pressure through said air pipe into said tank to build up pressure therein, or for exhausting air from said tank through said air pipe to create minus pressure in said tank.

6. In spraying apparatus, a spray liquid tank mounted for rotation on a longitudinal axis, the said tank formed at one end with an annular enlargement forming a chamber therearound, a liquid discharge pipe extending into said tank and terminating within said annular chamber, an air pipe extending into said tank and terminating in the upper portion thereof, and means for discharging air under pressure through said liquid pipe into said tank, or for exhausting air from said tank through said air pipe to create minus pressure in the said tank.

7. In ambulant spraying apparatus, a wheeled supporting frame, a spray liquid tank rotatably mounted on said frame, driving connections from said wheel frame to the spray liquid tank for rotating the latter, and means actuated by said wheeled frame for forcing air under pressure into said tank, or for exhausting air from the said tank.

8. In ambulant spraying apparatus, a wheeled supporting frame, a spray liquid tank rotatably mounted on said frame, operating connections from said frame to the tank for rotating the latter, a compressed air tank mounted on said frame in communication with said spray liquid tank, and means actuated from said wheeled frame for forcing air under pressure into said compressed air tank and spray liquid tank, or for exhausting air from the said tanks.

9. In ambulant spraying apparatus, a wheeled supporting frame, a spray liquid tank rotatably supported on said frame, operating connections from said wheeled frame to the spray liquid tank for rotating the latter, a fixed compressed air tank on said frame, an air line from said fixed tank to and discharging into said spray liquid tank, means actuated from said wheeled frame for forcing air under pressure into said fixed tank, or for exhausting air therefrom, and an automatic valve in said air line controlling discharge of air under pressure into said rotary spray liquid tank.

10. In ambulant spraying apparatus, a wheeled supporting frame, a spray liquid tank rotatably mounted on said frame, means actuated from said wheeled frame for rotating the spray liquid tank, a compressed air tank on said frame, an air line from the compressed air tank to and discharging into the spray liquid tank, an automatic pressure controlled valve in said air line intermediate the said tanks, a by-pass line from said air line around the automatic valve therein, and air compressing means in said by-pass line for forcing air under pressure into said compressed air tank or for exhausting air therefrom, the said air compressing means actuated from the wheeled supporting frame.

11. In ambulant spraying apparatus, a wheeled supporting frame, a spray liquid tank rotatably supported thereon, driving connections from the wheeled frame to the spray liquid tank for rotating the latter, a compressed air tank mounted on the frame, an air line from the compressed air tank to and discharging into said rotatable spray liquid tank, air compressing means in communication with and discharging into the compressed air tank for forcing air under pressure therein to build up pressure in said spray liquid tank, or for exhausting air therefrom to establish minus pressure in the spray liquid tank, and operating mechanism for said air compressing means actuated by said wheeled supporting frame.

12. In spraying apparatus, in combination, a spray liquid tank, a compressed air tank, an air line from the compressed air tank to the spray liquid tank, an automatic valve in said air line intermediate the said tanks, a by-pass line from said air line around the automatic valve, air compressing or exhausting means mounted in said by-pass line, and controlling valves in the said by-pass line operable to cause said air compressing means to force air under pressure into said compressed air tank and said spray liquid tank, or to exhaust air from the said tanks.

13. In ambulant spraying apparatus, a wheeled supporting frame including spaced longitudinal side beams at one end thereof inclined upwardly and extended forwardly to form an elevated support, spaced cross members extending between said side beams, a spray liquid tank rotatably supported between said cross members, operating connections from and actuated by said wheeled frame to the spray liquid tank for rotating the latter, a compressed air tank mounted on the elevated support formed by said side beams, an air line from said compressed air tank to said rotatable spray liquid tank, the said air line fixed and extending axially and discharging into the spray liquid tank, and means actuated from the wheeled supporting frame for forcing air under pressure into said compressed air tank, or for exhausting air therefrom.

14. In ambulant spraying apparatus, a wheeled supporting frame including spaced side beams at one end inclined upwardly and extended to form an elevated support, spaced cross members on said side beams, a spray liquid tank having hollow axles at opposite ends thereof rotatably supported on and between said cross members, operating mechanism actuated by movement of said wheeled frame for rotating said liquid tank, a fixed discharge extending from the interior of said liquid tank outwardly therefrom through one of said hollow axles, a fixed air pipe extending into said tank through the other of said hollow axles, and a compressed air tank mounted on the elevated support formed by said side beams and in communication with the air pipe to said liquid tank.

15. In spraying apparatus, in combination, a spray liquid tank, a compressed air tank, an air line from the compressed air tank to and discharging into the liquid tank, a normally open pressure controlled valve in said air line adapted to close when the pressure in the liquid tank exceeds a predetermined pressure and to open when the pressure falls below the predetermined pressure, a by-pass line from and to the air line around said valve, means mounted in said by-pass line for forcing air under pressure into said compressed air tank and for exhausting air therefrom, and valves mounted in said by-pass line for causing said means to force air into said compressed air tank or to exhaust air therefrom.

Signed at Cambria, Lockport, New York, this 3rd day of August, 1922.

CHARLES L. GINTY.